No. 770,411. Patented September 20, 1904.

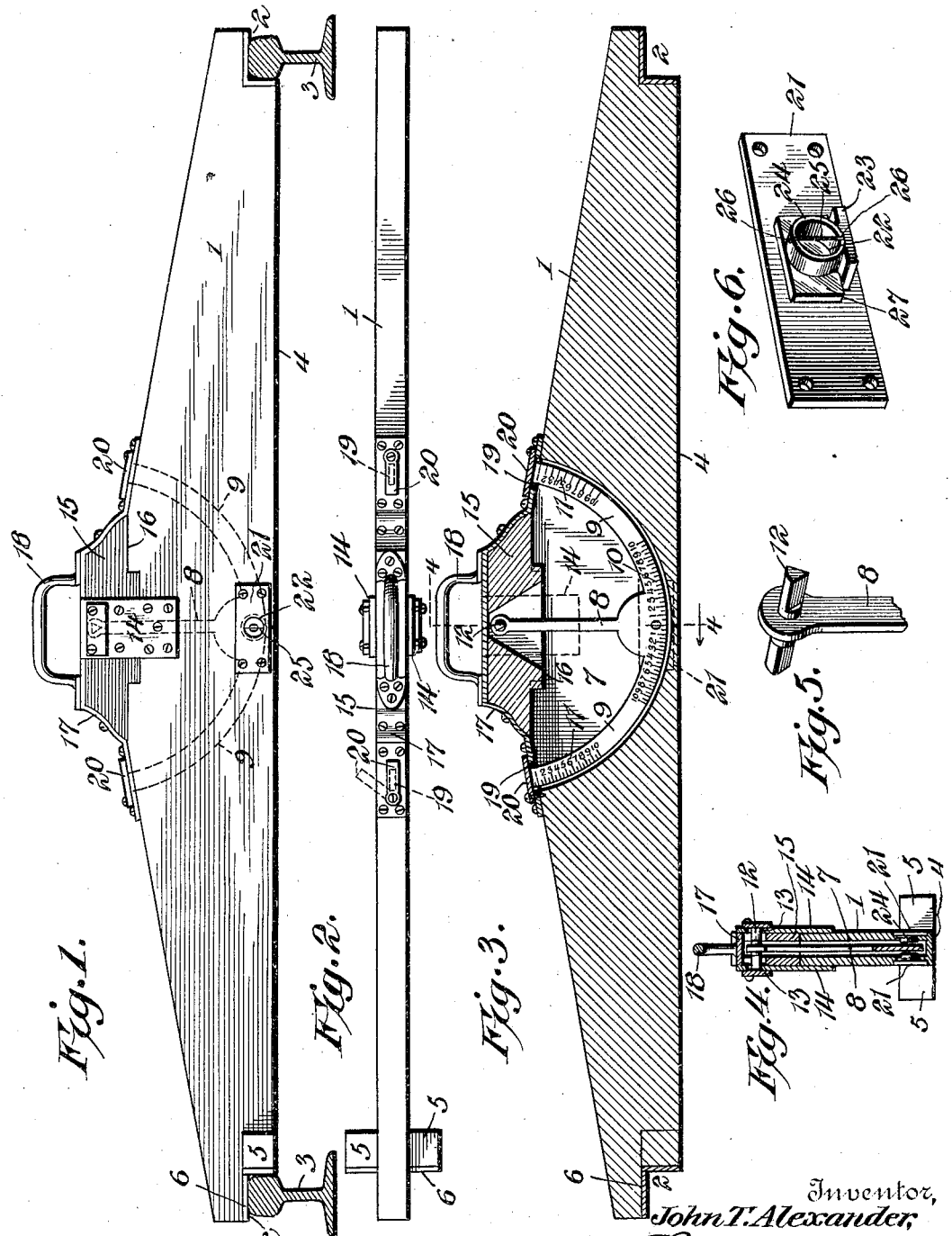

UNITED STATES PATENT OFFICE.

JOHN THOMAS ALEXANDER, OF ATLANTA, GEORGIA, ASSIGNOR OF ONE-HALF TO JOSEPH C. MASSENGALE AND JOSEPH A. McCORD, OF ATLANTA, GEORGIA.

COMBINED LEVEL AND GAGE.

SPECIFICATION forming part of Letters Patent No. 770,411, dated September 20, 1904.

Application filed February 11, 1904. Serial No. 193,141. (No model.)

*To all whom it may concern:*

Be it known that I, JOHN THOMAS ALEXANDER, a citizen of the United States, residing at Atlanta, in the county of Fulton and State of Georgia, have invented a new and useful Combined Level and Gage, of which the following is a specification.

The invention relates to a combined level and gage.

The object of the present invention is to improve the construction of levels and gages and to provide a simple and comparatively inexpensive one of great strength and durability designed particularly for use on railroads in constructing and repairing tracks and adapted to facilitate such work.

A further object of the invention is to provide a device of this character adapted to be readily placed on two rails for indicating the proper gage or distance between the same and capable of enabling the relative position of the rails to be readily ascertained.

Another object of the invention is to provide a device of this character which will enable a person while jacking up a rail to see the indicating devices for ascertaining when the rail is in proper position, whereby such operation may be performed by one person instead of two, as has heretofore been often necessary.

Furthermore, the invention has for its object to provide a gage which will be particularly advantageous for use on curves of railroad-tracks and which may also be employed for leveling pavements, platforms, and the like.

Also it is the object of the invention to enable the movable parts of the combined gage and level to be housed, whereby they will be protected from the weather and from dust and dirt and an accurate instrument thereby assured.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of a combined gage and level constructed in accordance with this invention and shown applied to a pair of rails. Fig. 2 is a plan view. Fig. 3 is a longitudinal sectional view. Fig. 4 is a transverse sectional view on the line 4 4 of Fig. 3. Fig. 5 is a detail perspective view of the top of the bob or pendulum. Fig. 6 is a detail perspective view of one of the lower side plates, illustrating the construction of the sight-apertures.

Like numerals of reference designate corresponding parts in all the figures of the drawings.

1 designates a level bar or stock designed to be constructed of any suitable material, either wood or metal, and when constructed of wood in practice it will be provided at its edges with a suitable metal binding-strip. The level bar or stock, which is oppositely tapered, is designed to be constructed of a length to correspond with the gage of the road on which it is to be used, and it is provided at its ends with rail-receiving recesses 2, arranged at the lower edge of the stock or bar to permit the device to be placed upon a pair of rails 3, as illustrated in Fig. 1 of the drawings. The rail-receiving recesses are angular and provided with edges arranged, respectively, perpendicular to and parallel with the lower edge 4 of the stock or bar. The lower edge of the stock or bar is straight and is adapted to be employed as a straight-edge for enabling the device to be used for leveling tile pavements and platforms and various other kinds of work. One end of the level-bar is provided at the inner upright edges of the rail-receiving recess with laterally-extending arms or projections 5, having outer upright edges arranged in the same plane as the adjacent upright edge of the recess to form a continuation of the same for providing a broad side bearing at one end of the level bar or stock.

The recess and the outer upright face of the laterally-extending arms or projections 5 are preferably provided with wear-plates 6 of angle form, as shown, suitably secured to the stock or bar 1 and to the arms or projections 5 thereof. The angular wear-plate is removable and can be readily removed when worn.

The level-bar is provided at its central portion with a recess 7, extending downward from the upper portion of the stock or bar and receiving a bob or pendulum 8, hung at the top of the stock or bar, as hereinafter described, and provided at its bottom with oppositely-disposed curved arms 9, having central and end scales 10 and 11 and extending in the direction in which the bob or pendulum oscillates, whereby one or the other of the arms is caused to project from the stock when the bob or pendulum is oscillated, as hereinafter explained. The pendulum or bob is provided at the top with a pivot 12, having opposite knife-edges arranged in suitable bearings 13 of upper side plates 14. The upper side plates are secured to the bar or stock 1 at opposite sides thereof, as clearly shown in Figs. 1 and 4, and the stock or bar is preferably provided with a removable top section or block 15, closing the recess 7 and provided with a suitable handle 9. The block or section is recessed or cut away to provide a space for the upper portion of the bob or pendulum to permit the necessary movement of the same. The lower edge 16 of the block or section is provided with a central projecting portion which fits in a corresponding recess of the adjacent portion of the body of the stock or bar, and the upper edge of the section 15 is provided with a suitable binding-strip 17, projecting beyond the ends of the block or section 15 and suitably secured to the body portion of the stock or bar, as shown; but the stock or bar may be constructed in any other manner, as will be readily understood. A handle 18 is suitably secured to the block or section for enabling the device to be conveniently carried. The bottom of the recess 7 is curved to conform to the configuration of the arms 9, and the stock or bar is provided at the top with opposite openings 19, formed in the ends of the metal strip 17 and adapted to permit the end portions of the arms 9 to extend through them for indicating the position of the stock or bar and for showing the amount or degree of inclination of the same. The stock or bar is also provided with pivoted closures 20, Fig. 2, adapted when the combined gage or level is not in use to cover the openings 19 for the purpose of excluding dust and moisture and also for holding the bob or pendulum stationary to prevent the same from being accidentally injured. By this construction the accuracy of the instrument is preserved and assured. The stock or bar is also provided at opposite sides of its lower portion with suitable sight-apertures formed by plates 21, having circular openings 22 and provided at their inner faces with projecting flanges 23. The lower side plates are also provided with cylindrical supports 24, consisting of short tubes formed integral with the flanges 23 and having diametrically-arranged indicators 25, consisting of short wires arranged perpendicularly to the lower edge of the level bar or stock and having their terminals secured in upper and lower kerfs 26 of the tubular or cylindrical supports. The tubular or cylindrical supports are spaced from the inner faces of the side plates, and transparent plates 27, Fig. 6, of glass or other suitable material, are interposed between the tubular supports and the face-plates 21 for excluding dirt and moisture from the interior of the instrument. The fixed indicator 25 coöperates with the central scale 10, which extends in opposite directions from the center of the lower portion of the pendulum or bob. When the zero-mark of the central scale registers with the fixed indicator, the lower edge of the level stock or bar is horizontal, and when the level stock or bar is in an inclined position the amount of inclination will be indicated by the position of the central scale with relation to the fixed indicator. These lower or side face-plates are let into sides of the stock or bar, as shown, and are suitably secured to the same.

Having thus fully described my invention, what I claim as new, and desire to secure by Letters Patent, is—

1. A device of the class described, comprising a stock, and a bob or pendulum carried by the stock and provided with opposite indicating-arms located within the stock and extending from the bob or pendulum at a point below the pivot thereof and in the direction in which the pendulum or bob oscillates, whereby one or the other of the arms is caused to project when the bob or pendulum is oscillated, substantially as described.

2. A device of the class described, comprising a stock, a bob or pendulum carried by the stock, and provided with opposite indicating-arms normally located within the stock and arranged to be projected exteriorly of the same, and means for engaging the arms for holding the same within the stock, substantially as described.

3. A device of the class described, comprising a stock, an interiorly-arranged pendulum or bob having opposite arms adapted to project exteriorly of the stock through openings thereof, and closures arranged to cover the openings and engage the arms, substantially as described.

4. A device of the class described, comprising a stock having a sight-aperture at the bottom and provided at the top with opposite openings, and an interiorly-arranged bob or pendulum carried by the stock, and provided with oppositely-disposed curved arms arranged to project through the top openings, said pendulum or bob being provided at the inner and outer portions of the arms with scales, substantially as described.

5. A device of the class described, comprising a stock having top openings, a pendulum or bob carried by the stock and provided with oppositely-disposed curved arms arranged to project through the top openings, and pivoted plates mounted upon the stock and arranged to cover the top openings and engage the said arms for holding the bob or pendulum stationary, substantially as described.

6. A device of the class described, comprising a stock, a bob or pendulum carried by the same, a plate having an opening and provided at its inner face with a flange, said plate being also provided with a support carried by the flange and spaced from the inner face of the plate, a fixed indicating device carried by the support, and a transparent plate or piece arranged on the flange in the space between the support and the plate, on which the same is mounted, substantially as described.

7. A device of the class described, comprising a stock, a bob or pendulum carried by the same, a face-plate provided with an inwardly-extending flange, and having a tubular support mounted on the flange and spaced from the inner face of the said plate, a fixed indicating device arranged diametrically of the tubular support, and a transparent plate or face interposed between the face-plate and the tubular support, substantially as described.

8. A device of the class described, comprising a stock, and a bob or pendulum carried by the stock and provided with opposite indicating-arms located within the stock when the bob or pendulum is perpendicular to the lower edge of the same, said arms being extended in the direction in which the bob or pendulum oscillates, whereby one or the other of the arms is caused to project from the stock when the bob or pendulum is moved from its perpendicular position with relation to the lower edge of the stock, substantially as described.

In testimony that I claim the foregoing as my own I have hereto affixed my signature in the presence of two witnesses.

JOHN THOMAS ALEXANDER.

Witnesses:
 Jos. D. Greene, Jr.,
 S. H. Askew.